(12) United States Patent
Hippchen

(10) Patent No.: US 9,786,901 B2
(45) Date of Patent: Oct. 10, 2017

(54) ELECTRODE AND METHOD FOR MANUFACTURING AN ELECTRODE

(71) Applicant: Robert Bosch GmbH, Stuttgart (DE)

(72) Inventor: Silvan Hippchen, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 539 days.

(21) Appl. No.: 14/217,846

(22) Filed: Mar. 18, 2014

(65) Prior Publication Data

US 2014/0287320 A1    Sep. 25, 2014

(30) Foreign Application Priority Data

Mar. 20, 2013  (DE) .................. 10 2013 204 863

(51) Int. Cl.
| | | |
|---|---|---|
| *H01M 4/13* | (2010.01) | |
| *H01M 4/04* | (2006.01) | |
| *H01M 4/1395* | (2010.01) | |
| *H01M 4/66* | (2006.01) | |
| *H01M 4/139* | (2010.01) | |
| *H01M 4/36* | (2006.01) | |

(52) U.S. Cl.
CPC ......... *H01M 4/045* (2013.01); *H01M 4/0411* (2013.01); *H01M 4/13* (2013.01); *H01M 4/139* (2013.01); *H01M 4/1395* (2013.01); *H01M 4/366* (2013.01); *H01M 4/661* (2013.01); *Y02P 70/54* (2015.11)

(58) Field of Classification Search
USPC ......................................... 429/211, 233, 245
See application file for complete search history.

(56) References Cited

U.S. PATENT DOCUMENTS

| | | | | |
|---|---|---|---|---|
| 7,579,109 B2 * | 8/2009 | Honda | ............. | H01M 10/0436 29/623.1 |
| 8,105,714 B2 * | 1/2012 | Schmidt | ............. | H01M 4/131 429/149 |
| 8,603,195 B2 * | 12/2013 | Pushparaj | ............ | H01G 9/0029 29/623.5 |
| 8,835,029 B2 * | 9/2014 | Ellis-Monaghan | ... | H01M 2/204 429/61 |

(Continued)

FOREIGN PATENT DOCUMENTS

| | | |
|---|---|---|
| DE | 10 2010 062140 | 5/2012 |
| DE | 10 2010 063143 | 6/2012 |

*Primary Examiner* — Tracy Dove
(74) *Attorney, Agent, or Firm* — Norton Rose Fulbright US LLP; Gerard Messina

(57) ABSTRACT

A method for manufacturing an electrode. To provide a particularly cost-effective method, which is able to provide a current collector layer that adheres well and is electrically well-connected, the method including: a) providing a layer having an active material; b) one-sided electrochemical deposition of a metallic material on the layer having the active material, thus forming a current collector layer having the metallic material; c) joining the product obtained in b) to another layer having an active material and to a contact element so that the current collector layer having the deposited metallic material is situated between two layers having an active material, and that the contact element for establishing contact is at least partially exposed and is in contact with the current collector layer having the deposited metallic material.

9 Claims, 2 Drawing Sheets

(56) References Cited

U.S. PATENT DOCUMENTS

| | | | | |
|---|---|---|---|---|
| 2010/0040950 A1* | 2/2010 | Buiel | ............... | H01G 9/04 |
| | | | | 429/211 |
| 2011/0159365 A1* | 6/2011 | Loveness | ............ | H01M 4/0428 |
| | | | | 429/218.1 |
| 2012/0214059 A1* | 8/2012 | Bauer | ................. | H01M 4/70 |
| | | | | 429/211 |
| 2014/0272597 A1* | 9/2014 | Mikhaylik | .......... | H01M 4/0402 |
| | | | | 429/233 |

* cited by examiner

ELECTRODE AND METHOD FOR MANUFACTURING AN ELECTRODE

RELATED APPLICATION INFORMATION

The present application claims priority to and the benefit of German patent application no. 10 2013 204 863.7, which was filed in Germany on Mar. 20, 2013, the disclosure of which is incorporated herein by reference.

FIELD OF THE INVENTION

The present invention relates to an electrode. The present invention further relates to a method for manufacturing an electrode.

BACKGROUND INFORMATION

In the manufacture of electrodes such as foil-type anodes for lithium-ion cells for example, the battery material is often applied in the form of a slurry on a current collector, which may be a current collector foil for example. This slurry is applied onto the current collector such as in particular onto the current collector foil by a blade process or a slot nozzle process. The current collector foil for this purpose is usually metallic foil, the metal being chosen as a function of the type of electrode to be manufactured. The current collector foil furthermore usually has a thickness in a range from greater than or equal to 7 μm to smaller than 20 μm.

It is furthermore known to produce an electrode film or an active material film separately, and to apply or fasten this separately produced electrode film following its production onto a current collector such as a current collector foil, for example.

In the aforementioned examples, the current collector may be developed from copper, for example, in the event that an anode is being produced, whereas the current collector may be developed from aluminum in the event that the electrode is a cathode.

SUMMARY OF THE INVENTION

The subject matter of the present invention is a method for manufacturing an electrode, including the method steps:
a) Providing a layer having an active material;
b) One-sided electrochemical deposition of a metallic material on the layer having the active material, thus forming a current collector layer (14) having the metallic material;
c) Joining the product obtained in method step b) to another layer having an active material and to a contact element in such a way that the current collector layer having the deposited metallic material is situated between two layers having an active material, and that the contact element for establishing contact is at least partially exposed and is in contact with the current collector layer having the deposited metallic material.

A method as described above makes it possible to manufacture an electrode, it being possible essentially to preserve the advantages of methods known from the related art, while reliably avoiding disadvantages of methods known from the related art in a cost-effective type of process.

For this purpose, the method for manufacturing an electrode includes providing a layer having an active material according to method step a). Thus, in this method step, first a separate layer is produced, which includes an active material, which may be in a concentration greater than or equal to 90% by weight. The active material may be developed in a manner known per se for a respective energy store. For the exemplary and non-limiting case of manufacturing an electrode for a lithium-ion battery, the active material for an anode may include graphite for example, which may be in a concentration greater than or equal to 94% by weight, whereas the active material for a cathode may include for example a lithium salt such as lithium nickel cobalt manganese oxide (NCM) or lithium manganese oxide (LMO), which may be in a concentration greater than or equal to 93% by weight. The active material is thus in particular a material or a substance or a substance mixture that is able to participate in active charging processes or discharging processes of an energy store. The layer may furthermore include a binder such as polyvinylidene fluoride (PVDF), for example, which may be in a concentration less than or equal to 4% by weight or less than or equal to 5% by weight, in which the previously described active material is distributed. Furthermore, a conductive additive, which may be in a concentration of less than or equal to 2% by weight, such as conductive carbon compounds, carbon black for example, may be added. Such an active material layer may be implemented by simply mixing the substances and subsequently shaping them.

The provided layer having the active material or the active material layer may as such already be stable or may be provided on a suitable carrier for example. The stability, which may be influenced as desired depending on the field of application, may in particular be set by the type and quantity of an added binder material.

In a further method step b), a metallic material is onesidedly electrochemically deposited on the layer having the active material so as to form a current collector layer having the metallic material, in particular being made of the metallic material. In this method step, a metallic material is deposited on one side on the active material layer. A metallic material in the sense of the present invention may be any metallic material that may be used as a current collector or form a current collector layer in a finished electrode. In particular, it may be advantageous if the metallic material is present in a particularly pure form. In order to achieve this, the metallic material is deposited electrochemically. In the sense of the present invention, an electrochemical deposition in particular may be understood in a manner known per se the deposition of a metal from a metal ion-containing electrolyte by the application of a voltage and thus by a flowing current. In particular, an electrochemical deposition may be understood as a galvanic deposition, which is also known as electroplating.

The electrochemical deposition occurs in particular in a onesided fashion, which means in the sense of the present invention in particular that advantageously only one side of the active material layer is coated, while the other side situated across from the coated side is not coated.

An electrochemical deposition is able to ensure that a highly pure metal is deposited on the active material layer, which may be advantageous depending on the application as previously described. An electrochemical deposition of the metallic material may be used in particular to provide a particularly thin current conductor layer, which may both reduce the weight of the electrode, which may be advantageous particularly in mobile applications, and which may furthermore save material of the deposited metal, which may lower the costs of the method further. Using coating methods according to the related art, such thin current conductor layers in particular are not possible or are possible only if improved.

Furthermore, a very intimate contact may be produced between the layer having the active material and the metal by an electrochemical deposition of the metallic material, which results in a particularly low contact resistance and allows for particularly good conductivity. This makes it possible to implement a particularly effective operation of an energy store that is equipped with an electrode of this kind.

Furthermore, an electrochemical deposition and the particularly intimate contact of the metal to the active material layer allow for a particularly good adherence of the metal on the active material layer, which allows for a particularly high long-term stability even after many charge or discharge cycles of an energy store equipped with an electrode of this kind.

Furthermore, electrochemical deposition methods are distinguished by the fact that they are easy to use and allow for a high process reliability, which makes it possible to manufacture particularly defined products. Moreover, existing industrial plant technology may be used for depositing the metal such that in this respect too no new developments are necessary, but rather an existing stock of experience may be utilized. This may also lower the costs of the method further.

Following an electrochemical deposition of the metal on the layer having the active material, as explained above, in another method step c) the product obtained in method step b) is joined to another layer having an active material and having a contact element in such a way that the current collector layer having the deposited metallic material is situated between two layers having an active material, and that the contact element for establishing contact is at least partially exposed and is in contact with the current collector layer having the deposited metallic material.

In this method step, the products obtained in method step b), that is, the active material layer having the applied metal as a current collector layer, is thus joined with another active material layer. For this purpose, it is possible in particular to use identical active material layers or identically developed active material layers. In the process, a contact element is inserted between the active material layers so as to contact the metal, that is, in particular in an electrically conductive contact. The contact element may be, for example, a foil of an electrically conductive material such as the same metal, for example, as was previously electrochemically deposited. In particular, a so-called current collector flag may be used. Fundamentally, however, any at least partially electrically conductive component may be used as contact element if it is able to be worked into the layer sequence and is able to be electrically contacted externally. The layer sequence produced in method step c) includes the layers active material, metal, contact element, active material. The layer sequence is made up of these layers in the aforementioned sequence, for example.

Following this method step c), the electrode may be completed. One skilled in the art is able to see that particularly the layer having the active material and the applied metal, may be developed, in particular by the selection and produced layer thickness of the metal, and by the selection, layer thicknesses and composition, for example the proportion of the binder, the active material layer, in such a way that the finished electrode is able to be developed in accordance with the desired field of application, for example as a stable fixed electrode or as a bendable foil, as is known per se to one skilled in the art in the field of electrodes.

The above reveals that the method described above allows for additional advantages over the method from the related art to be achieved such as in particular an improved conductivity between the current conductor and the active material, an improved contact between the active material and the current conductor, improved adhesion of the current conductor on the active material layer and lower manufacturing costs.

In the context of one development, an anode material may be used as the active material. In this development in particular, and thus in a method for manufacturing an anode as electrode, the method described above may be carried out particularly simply and cost-effectively. In particular, active materials for an anode are often less sensitive to the influence of water. It is thus possible to use even an aqueous metal ion solution as the electrolyte, which comes into direct contact with the active material in the electrochemical deposition of the metal, which markedly simplifies and reduces the cost of the method. Examples for an anode material or for an anode active material, particularly for the non-limiting and exemplary case of the manufacture of an anode for a lithium ion battery, include graphite together with, for example, a conductive additive such as carbon black, for example, and a binder.

In connection with another development, method step b) may be performed using an aqueous copper ion solution as electrolyte, for example including copper sulphate and possibly sulfuric acid. In this development, the method may also be configured to be particularly cost-effective since copper sulphate, for example, may be used particularly cost-effectively as an electrolyte. Moreover, electrolytes of this kind may be harmless for a plurality of active material layers such that the method may be used especially freely and does not bear the danger of negatively influencing the active material during the manufacture of the electrodes. Moreover, electrolyte materials of this kind are particularly stable over the long term such that the electrolyte as such may be used in a plurality of coating steps in succession, which may render the method even more cost-effective.

In connection with another development, method step b) may be performed using a solid matrix that absorbs the electrolyte. In this development, the metallic material may be electrochemically applied in a particularly defined manner, it being furthermore possible to apply very precisely structured coating patterns of the metallic material. For example, in this development, method step b) may be carried out using a sponge-like matrix, which is able to absorb a liquid electrolyte and bring it into contact with the surface to be coated in a defined manner. Such a sponge-like matrix may be developed from an acid-resistant fleece for example. In a non-limiting manner, a device also known as a brush module may be used in this development. This method step, moreover, may be performed using a so-called tampon galvanizing process. In such a method, the active material layer may be fastened to the negative pole of a facility or connected as the anode and may be enveloped in particular by a tampon-like object. The tampon-like object may be connected accordingly as a cathode by applying a voltage. For example, the electrolytic solution may be supplied to this tool by a hose line.

In connection with another development, method step c) may be performed by lamination. Laminating the layers in particular makes it possible to bond even the thinnest layers to one another, a particularly firm bond being furthermore achievable in this manner. A particularly sturdy formation for the electrode may thus be obtained in this development, even if the layer thicknesses are very small. Lamination is moreover a very mature and cost-effective method. A lamination may be performed in that the individual layers in particular together with the contact element are guided through a roller press or are pressed in a press. Pressing may be performed in particular by heating the layers so as to soften an existing binder in order to achieve an adhesion or a firm bond between the layers. Possible non-limiting parameters include a temperature in a range of approximately 160° C. and a pressing pressure in a range of approximately 100 kg.

In connection with another development, method step b) may be performed using a current density in a range from greater than or equal to 1 $A/dm^2$ to less than or equal to 5 $A/dm^2$. Such current densities may already be sufficient to be able to apply a metallic layer under mild conditions onto the active material layer. The current densities may in particular suffice to implement also an economical process by a limited process duration.

In connection with another development, a current collector layer including a metallic material may be produced in method step b), which has a thickness in a range of less than 7 μm, in particular in a range from greater than or equal to 1 μm to less than or equal to 5 μm, for example in a range from greater than or equal to 2 μm to less than or equal to 3 μm. In this development in particular, layer thicknesses may be produced that were not possible by the methods known from the related art. The advantage of such a thin layer may be seen particularly in a weight of the manufactured electrode that is as low as possible and furthermore in a particularly cost-effective manufacture. The layer thickness may be selected in particular as a function of the requirements regarding amperages to be discharged.

In the context of another development, the layer having an active material may be provided as detachably applied on a carrier material. In this development in particular, a particularly thin active material layer may be provided, which does not need to satisfy very high requirements regarding its stability. Thus, in this development in particular, the active material layer may be produced particularly freely and essentially without restrictions regarding the manufacturing method, which allows for a particularly great variety of applications of the electrodes to be manufactured or of the energy store to be manufactured. A sufficient stability of the electrode may be achieved in this instance after joining all layers in accordance with method step c).

In the context of another development, the layer having an active material may be provided by an extrusion method. An extrusion method in particular is able to produce layers having the active material that have good stability and are thus particularly well suited for the method described above. In this development in particular, layers having the active material may be manufactured or provided, which have good stability even in particular small thicknesses such that the respective layer may be processed even without providing a carrier material such as a carrier foil, for example, or may be provided in an electrochemical manner with a layer having a metallic material. For this purpose, an extrudability may be adjustable, for example, by the concrete composition of the active material layer such as, for example, the quantity of the existing binder.

Regarding additional advantages and features, explicit reference is hereby made to the explanations in connection with the electrode of the present invention and the figures. Features and advantages of the method of the present invention are also to be considered applicable to the electrode of the present invention and count as disclosed, and vice versa. The present invention also includes all combinations of at least two of the features disclosed in the specification, in the claims and/or in the figure.

A subject matter of the present invention is also an electrode that is manufactured as described above. Such electrodes in particular, for example anodes, may be developed as having particularly thin and thus light current conductors. The current conductors, for example, may have a thickness in a range of less than 7 μm, in particular in a range from greater than or equal to 1 μm to less than or equal to 5 μm, for example in a range from greater than or equal to 2 μm to less than or equal to 3 μm.

An electrode as described above and thus also an energy store equipped with such an electrode may thus be manufactured cost-effectively and have a particular broad field of application and be particularly advantageous for mobile applications. For example, it is possible to manufacture foil-like electrodes such as anodes in particular, which are also known as tapes, which may be used in particular in pouch cells.

Regarding additional advantages and features, explicit reference is hereby made to the explanations in connection with the method of the present invention and the figures. Features and advantages of the electrode of the present invention are also to be considered applicable to the method of the present invention and count as disclosed, and vice versa. The present invention also includes all combinations of at least two of the features disclosed in the specification, in the claims and/or in the figure.

Further advantages and advantageous refinements of the subject matters of the present invention are illustrated by the examples and drawings and elucidated in the following description. It should be noted that the examples and drawings have only a descriptive character and are not intended to limit the present invention in any form.

DETAILED DESCRIPTION

Figure 1:
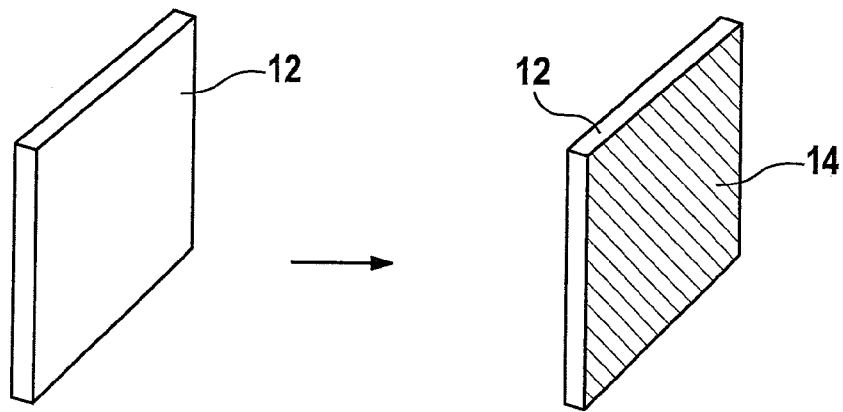
FIG. 1 shows a schematic representation of a method step of the method according to the present invention.

FIG. 1 shows a method step of the method according to the present invention for manufacturing an electrode. In this method step, a layer 12, provided by an extrusion method for example, having an active material, in particular an anode material, is equipped with a current collector layer 14. For this purpose, a metallic material is deposited electrochemically on one side on layer 12 having the active material. This method step may be performed in particular by using a liquid electrolyte, in particular by using a sulphate of a copper electrolyte as electrolyte and/or by using a solid matrix that absorbs the electrolyte. Furthermore, a current density in a range from greater than or equal to 1 $A/dm^2$ to less than or equal to 5 $A/dm^2$ may be used. The process may be controlled in particular by a suitable deposition time and/or a suitable current intensity so as to produce a layer 14 having a thickness in a range of less than 7 μm. Furthermore, for the non-restricting example of the manufacture of an anode, a pure copper layer may be deposited as layer 14.

Figure 2:
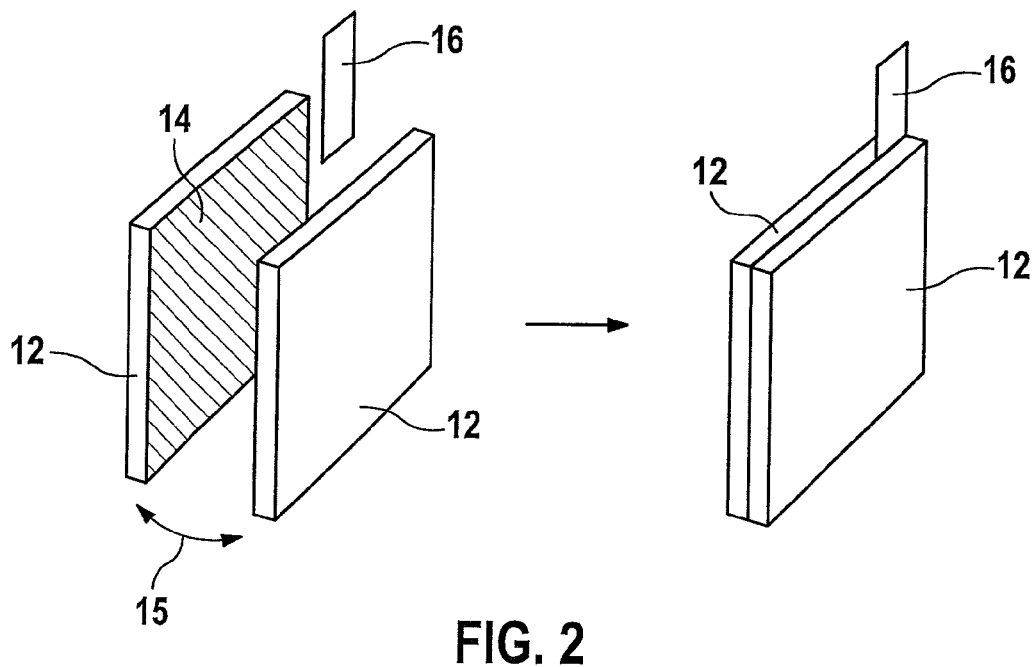
FIG. 2 shows a schematic representation of another method step of the method according to the present invention.

FIG. 2 shows another method step. In this method step, the product obtained in method step b) is joined to another layer 12 having an active material and to a contact element 16 in such a way that a layer 14 of the deposited metallic material is situated between two layers 12 having an active material, and that the contact element 16 for establishing contact is at least partially exposed and is in contact with the layer 14 of the deposited metallic material. This method step may be performed in particular by laminating layers 12, 14 and contact element 16, as is shown by arrow 15.

Figure 3:
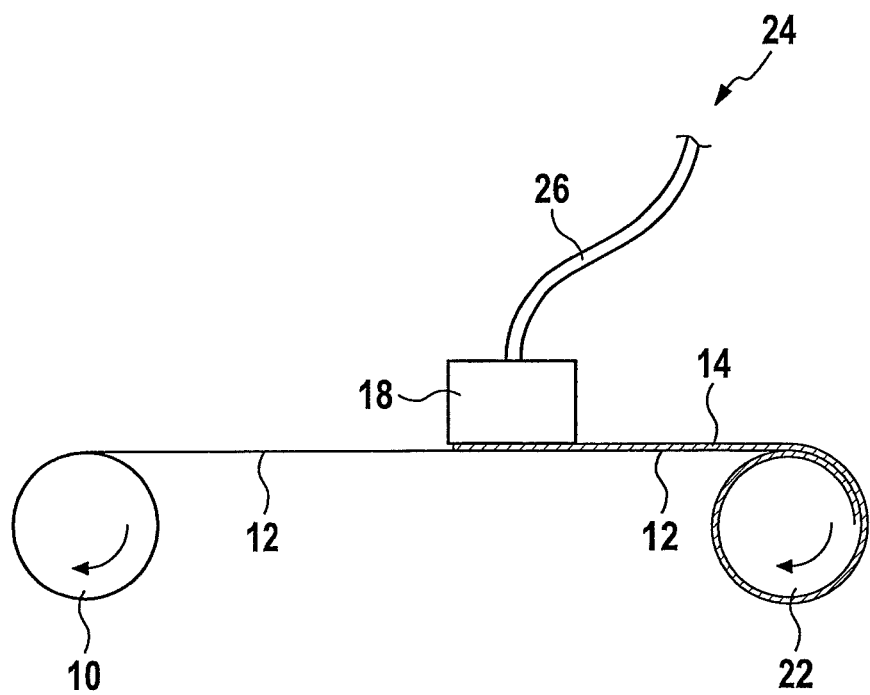
FIG. 3 shows a schematic representation of a device for a method according to the present invention.

FIG. 3 shows a set-up 24, by which a metallic layer 14 may be applied on a layer 12 of an active material. In particular, layer 12 including the active material may be developed in a foil-like manner and rolled up on a roll 10. The active material layer is then rolled off from roll 10 and rolled up on a roll 22, the current collector layer 12 being guided along a device 18 for electrochemical deposition or an electrochemical deposition device. Device 18 may have, for example, a sponge soaked with electrolyte or a galvanic tampon, which touches layer 12, while it is guided along device 18.

An electrolyte feed device 26 may be provided in order to ensure that the sponge, for example, is continually soaked with electrolyte. The sponge may furthermore be poled by a voltage source as a cathode, whereas layer 12 may be poled as an anode.

Particularly when using a set-up 24 as explained above, layer 12 may be provided as having an active material that is applied in detachable fashion on a carrier material.

What is claimed is:

1. A method for manufacturing an electrode, the method comprising:
    (a) providing a layer having an active material;
    (b) providing one-sided electrochemical deposition of a metallic material on the layer having the active material by using a solid matrix that absorbs an electrolyte, so as to form a current collector layer having the metallic material and having a thickness in a range from greater than or equal to 1 µm to less than 7 µm;
    (c) joining a product obtained in (b) to another layer having an active material and to a contact element so that the current collector layer having the deposited metallic material is situated between the layer having an active material and the another layer having an active material, and that the contact element for establishing contact is at least partially exposed and is in contact with the current collector layer having the deposited metallic material.

2. The method of claim 1, wherein an anode material is used as at least one of the active material of the layer or as the active material of the another layer.

3. The method of claim 1, wherein (b) is performed by using an aqueous copper ion solution as the electrolyte.

4. The method of claim 1, wherein (c) is performed by lamination.

5. A method for manufacturing an electrode, the method comprising:
    (a) providing a layer having an active material;
    (b) providing one-sided electrochemical deposition of a metallic material on the layer having the active material by using a solid matrix that absorbs an electrolyte, so as to form a current collector layer having the metallic material;
    (c) joining a product obtained in (b) to another layer having an active material and to a contact element so that the current collector layer having the deposited metallic material is situated between the layer having an active material and the another layer having an active material, and that the contact element for establishing contact is at least partially exposed and is in contact with the current collector layer having the deposited metallic material,
    wherein (b) is performed using a current density in a range from greater than or equal to 1 A/dm$^2$ to less than or equal to 5 A/dm$^2$.

6. The method of claim 1, wherein at least one of the layer having an active material or the another layer having the active material is provided as being applied on a carrier material in a detachable manner.

7. A method for manufacturing an electrode, the method comprising:
    (a) providing a layer having an active material;
    (b) providing one-sided electrochemical deposition of a metallic material on the layer having the active material by using a solid matrix that absorbs an electrolyte, so as to form a current collector layer having the metallic material;
    (c) joining a product obtained in (b) to another layer having an active material and to a contact element so that the current collector layer having the deposited metallic material is situated between the layer having an active material and the another layer having an active material, and that the contact element for establishing contact is at least partially exposed and is in contact with the current collector layer having the deposited metallic material,
    wherein at least one of the layer having an active material or the another layer having the active material is provided by an extrusion process.

8. The method of claim 1, wherein the thickness of said current collector layer lies in a range from greater than or equal to 1 µm to less than or equal to 5 µm.

9. The method of claim 1, wherein the thickness of said current collector layer lies in a range from greater than or equal to 2 µm to less than or equal to 3 µm.

* * * * *